(12) United States Patent
Schumacher et al.

(10) Patent No.: US 11,214,186 B2
(45) Date of Patent: Jan. 4, 2022

(54) HOIST FOR VEHICLE WITH INTERCHANGEABLE BODY

(71) Applicant: Deist Industries, Inc., Hadley, PA (US)

(72) Inventors: Andrew J. Schumacher, Cranberry Township, PA (US); Jeffrey M. Burns, Waterford, PA (US)

(73) Assignee: DEIST INDUSTRIES, INC., Hadley, PA (US)

( * ) Notice: Subject to any disclaimer, the term of this patent is extended or adjusted under 35 U.S.C. 154(b) by 3 days.

(21) Appl. No.: 16/808,610

(22) Filed: Mar. 4, 2020

(65) Prior Publication Data

US 2021/0276475 A1    Sep. 9, 2021

(51) Int. Cl.
*B60P 1/64*     (2006.01)
*B60P 1/16*     (2006.01)

(52) U.S. Cl.
CPC ............. *B60P 1/6454* (2013.01); *B60P 1/16* (2013.01); *B60P 1/6409* (2013.01); *B60P 1/6427* (2013.01); *B60P 1/6481* (2013.01)

(58) Field of Classification Search
CPC ........ B60P 1/16; B60P 1/6409; B60P 1/6427; B60P 1/6454; B60P 1/6463; B60P 1/6481; B60P 1/649
USPC .......................... 298/17.5; 414/494, 498, 500
See application file for complete search history.

(56) References Cited

U.S. PATENT DOCUMENTS

| | | | |
|---|---|---|---|
| 1,269,265 A | | 6/1918 | Duggan |
| 1,633,515 A | * | 6/1927 | Brick .................. B60P 1/12 298/38 |
| 2,665,020 A | * | 1/1954 | Whittle ................. B60P 1/6454 414/500 |
| 2,789,715 A | | 4/1957 | Filipoff et al. |
| 3,606,059 A | * | 9/1971 | Haberle, Jr. .......... B60P 1/6454 414/478 |
| 4,015,879 A | * | 4/1977 | Shonkwiler ............... B60P 1/30 298/14 |
| 4,750,855 A | | 6/1988 | Anderson |
| 4,986,719 A | * | 1/1991 | Galbreath ............. B60P 1/6454 280/405.1 |

(Continued)

FOREIGN PATENT DOCUMENTS

EP    2946970 B1    7/2019
JP    06-336137    12/1994

(Continued)

*Primary Examiner* — James Keenan
(74) *Attorney, Agent, or Firm* — Emerson, Thomson & Bennett, LLC; Roger D. Emerson

(57) ABSTRACT

Provided in this disclosure is a hoist for raising and mounting an interchangeable vehicle body onto a vehicle chassis. The hoist includes a hoist frame having a pivot end and an elevated end for slidably supporting the interchangeable body. A subframe with a bolt-on assembly is provided for fixedly connecting to the vehicle chassis. A linkage connects the hoist frame to the subframe. The linkage also includes a hinge joint member for raising the elevated end of the hoist frame. A mounting bracket pivotally connects to the pivot end of the hoist frame. The mounting bracket has a bolt-on assembly for fixedly connecting to the vehicle chassis. A winch assembly is retained in the elevated end of the hoist frame and extending to the pivot end for raising the interchangeable body onto the hoist frame.

14 Claims, 13 Drawing Sheets

(56) References Cited

U.S. PATENT DOCUMENTS

| | | | | |
|---|---|---|---|---|
| 5,133,633 | A | * | 7/1992 | Grata .................... B60P 1/6454 |
| | | | | 414/477 |
| 5,169,194 | A | * | 12/1992 | Yamashita ............ B60P 1/6427 |
| | | | | 220/1.5 |
| 5,405,233 | A | * | 4/1995 | Cordell .................... B60P 1/64 |
| | | | | 414/346 |
| 5,829,946 | A | | 11/1998 | McNeilus et al. |
| 6,120,234 | A | * | 9/2000 | Dinverno ................. B25H 3/00 |
| | | | | 14/71.1 |
| 6,409,275 | B1 | | 6/2002 | Gerding |
| 6,413,033 | B1 | | 7/2002 | Monroig, Jr. |
| 6,431,577 | B1 | | 8/2002 | Chapman |
| 6,647,896 | B1 | * | 11/2003 | Nottingham ........... B61D 19/00 |
| | | | | 105/378 |
| 7,037,062 | B2 | | 5/2006 | Oliver |
| 7,096,963 | B2 | * | 8/2006 | Moncus ................ B66C 23/208 |
| | | | | 166/381 |
| 7,357,457 | B2 | | 4/2008 | Thomas |
| 8,393,686 | B2 | * | 3/2013 | Dunigan .................... B60P 1/20 |
| | | | | 298/22 R |
| 10,029,603 | B2 | | 7/2018 | Stocks et al. |
| 2008/0112786 | A1 | | 5/2008 | Deist et al. |
| 2010/0101119 | A1 | * | 4/2010 | Roberts ..................... E01H 5/06 |
| | | | | 37/231 |
| 2016/0280114 | A1 | | 9/2016 | Baxter, Jr. |
| 2020/0307435 | A1 | * | 10/2020 | Franiak .................. B62D 63/08 |

FOREIGN PATENT DOCUMENTS

| | | |
|---|---|---|
| KR | 1990-0018596 | 11/1990 |
| WO | 2001038136 A1 | 5/2001 |

* cited by examiner

HOIST FOR VEHICLE WITH INTERCHANGEABLE BODY

I. BACKGROUND

A. Technical Field

This invention pertains generally to the field of vehicles such as trucks that employ interchangeable bodies. In particular, the invention pertains to hoists that are used for raising and mounting an interchangeable vehicle body onto a vehicle chassis.

B. Description of Related Art

Vehicles such as trucks are known to have different types of bodies, including a flat bed, a dumping body, an enclosed freight body, etc. Trucks of the same class can have various different bodies mounted onto the same chassis. Typically, vehicles such as trucks have a dedicated body that is permanently mounted to a chassis. Such a truck is sold and used as one type of special purpose vehicle, for handling the special types of jobs associated with the dedicated body.

Vehicles with dedicated bodies are limited in use for only the types of special jobs that can be performed by that particular body. For example, a dump truck is only useful for dumping. Such vehicles can remain idle while their associated types of jobs are not being performed. A small business may not have the available resources to purchase and maintain a fleet of dedicated vehicles having different bodies. For this reason, vehicles having interchangeable bodies are known to have certain useful advantages. A truck using interchangeable bodies enables the same single vehicle to be converted and adapted for use with a variety of different jobs, without requiring a fleet of separate vehicles to be maintained.

Such vehicles with interchangeable bodies typically include a hoist for raising and mounting an interchangeable body onto a vehicle chassis. Such a common-type hoist 10 includes a movable hoist frame for supporting an interchangeable body, which is mounted to a subframe that is welded onto the vehicle chassis. In this manner, the subframe is maintained in a fixed position. The hoist frame can be selectively elevated and inclined in such a manner as to allow an interchangeable body to be slidably mounted upon the chassis.

Though there are benefits to using interchangeable bodies, vehicles with interchangeable bodies are also subject to certain drawbacks. Such a vehicle must be dedicated for the specific use of mounting interchangeable bodies, since a welded hoist often precludes conversion to another single use vehicle. It is thus difficult to convert the vehicle back to other uses besides mounting interchangeable bodies due to damage to the chassis from welding. Also, welding is typically outsourced to a professional welder rather than performed by on-site personnel.

Moreover, the hoist can become damaged from repeated mountings and remountings of different types of interchangeable bodies. Replacing a damaged hoist can be a time-consuming matter due in part to scheduling outsourced welding services, resulting in vehicle down time. And the chassis can be further damaged by repeated welding operations from repeated hoist replacements, which can shorten vehicle life or require additional vehicle servicing to repair or replace the chassis.

In addition, previous type welded hoist systems are specifically sized to only permit a single length of interchangeable body to be deployed. Moreover, in such welded hoist systems, the components for elevating the hoist frames are hard mounted at a fixed angle, which reduces the usefulness of certain interchangeable body types for certain applications. Additionally, such welded hoist systems are more prone to wear and tear, which can shorten the useful life of the system.

II. SUMMARY

Provided in this disclosure is a hoist system for raising and mounting an interchangeable vehicle body onto a vehicle chassis. The hoist includes a hoist frame having a pivot end and an elevated end for slidably supporting the interchangeable body. A subframe with a bolt-on assembly is provided for fixedly connecting to the vehicle chassis. A linkage connects the hoist frame to the subframe. The linkage also includes a hinge joint member for raising the elevated end of the hoist frame. A mounting bracket pivotally connects to the pivot end of the hoist frame. The mounting bracket has a bolt-on assembly for fixedly connecting to the vehicle chassis. A winch assembly is retained in the elevated end of the hoist frame and extending to the pivot end for raising the interchangeable body onto the hoist frame.

The present hoist frame can include first and second parallel frame members, each extending along a longitudinal axis of the hoist frame between the elevated end and the pivot end, for supporting the interchangeable vehicle body. One or both of these parallel frame members can also include a body hold down bracket to enable different sized interchangeable vehicle bodies to be used on the hoist. Further, the body hold down bracket can support one or more greaseless slide pads formed of a low friction material to support the interchangeable vehicle body during movement along the hoist.

The parallel frame members of the present hoist frame can also include one or more greaseless slide strips, formed of a low friction material, and mounted along a side of the respective one of the first and second parallel frame members, for protecting against frictional damage. Additionally, the parallel frame members can also include one or more greaseless rollers, mounted at a pivot end of the respective parallel frame members, for facilitating mounting of the interchangeable vehicle body onto the hoist.

The present hoist system for raising and mounting an interchangeable vehicle body onto a vehicle chassis can also include a hydraulic cylinder, connected to the subframe, for displacing the linkage to raising the elevated end of the hoist frame. Additionally, a pump plate is connected to the subframe for supporting the hydraulic and electrical components that power the system. The mounting bracket of the present hoist system can also include a greaseless V-roller assembly for slidably supporting a cable of the winch assembly for raising the interchangeable body onto the hoist frame. Further, a winch plate can be provided in the elevated end of the hoist frame. The winch plate includes two perpendicular sides for connecting to two respective sides of the winch assembly, such that the winch plate supports the winch assembly in two separate planes.

In the present hoist system, the first and second parallel subframe members are each formed with a plurality of modular self-locating holes for engaging and supporting the linkage at a respective plurality of selective positions along the subframe. Similarly, the first and second parallel frame members are each formed with a plurality of modular self-locating holes for engaging and supporting the linkage at a respective plurality of selective positions along the hoist frame. The selective placement of the linkage at these respective modular self-locating holes enables the hoist system to be modularly adjusted to provide different capacities.

According to an aspect of the invention, a hoist system is provided which can be readily installed to a vehicle chassis without welding.

According to another aspect of the invention, a hoist system is provided which can be installed to a vehicle chassis by an authorized dealer.

According to still another aspect of the invention, a hoist system is provided which can be installed to a vehicle chassis without permanent dedication of the vehicle for use with interchangeable bodies.

According to yet another aspect of the invention, a hoist system is provided which is resistant to damage from repeated mountings and remountings.

According to a further aspect of the invention, a hoist system is provided which can be quickly and readily replaced without causing damage to the vehicle chassis.

According to another further aspect of the invention, a modular hoist system is provided in which the position of the linkage can be selectively adjusted to accommodate a variety of different capacities.

Other benefits and advantages of this invention will become apparent to those skilled in the art to which it pertains upon reading and understanding of the following detailed specification.

III. BRIEF DESCRIPTION OF THE DRAWINGS

The disclosed hoist for raising and mounting an interchangeable vehicle body onto a vehicle chassis may take physical form in certain parts and arrangement of parts, embodiments of which will be described in detail in this specification and illustrated in the accompanying drawings which form a part hereof and wherein.

IV. DETAILED DESCRIPTION

Figure 1:
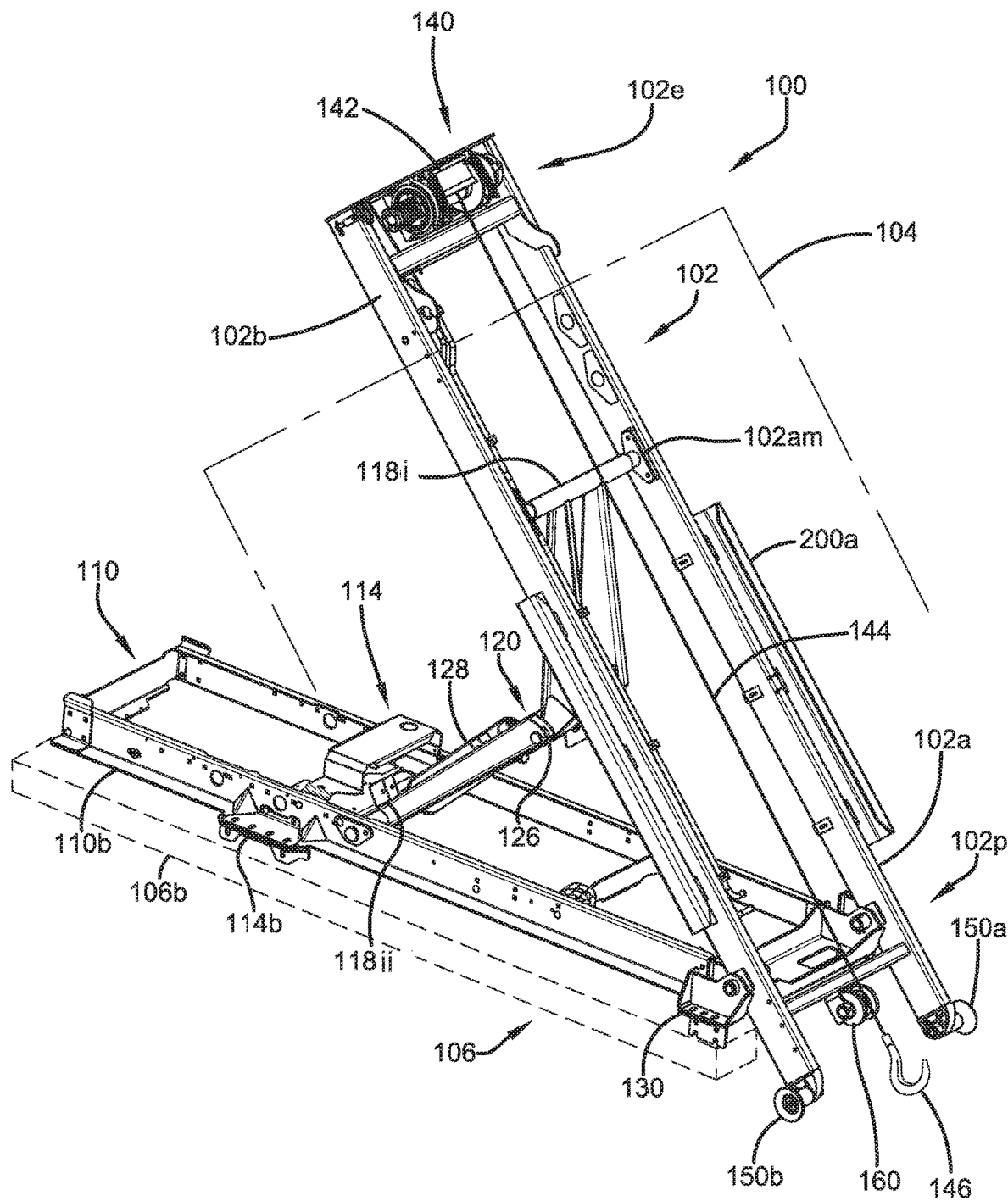
FIG. 1 is a perspective view showing the left side of an exemplary embodiment of a hoist system for raising and mounting an interchangeable vehicle body onto a vehicle chassis according to the present invention.
Figure 2:
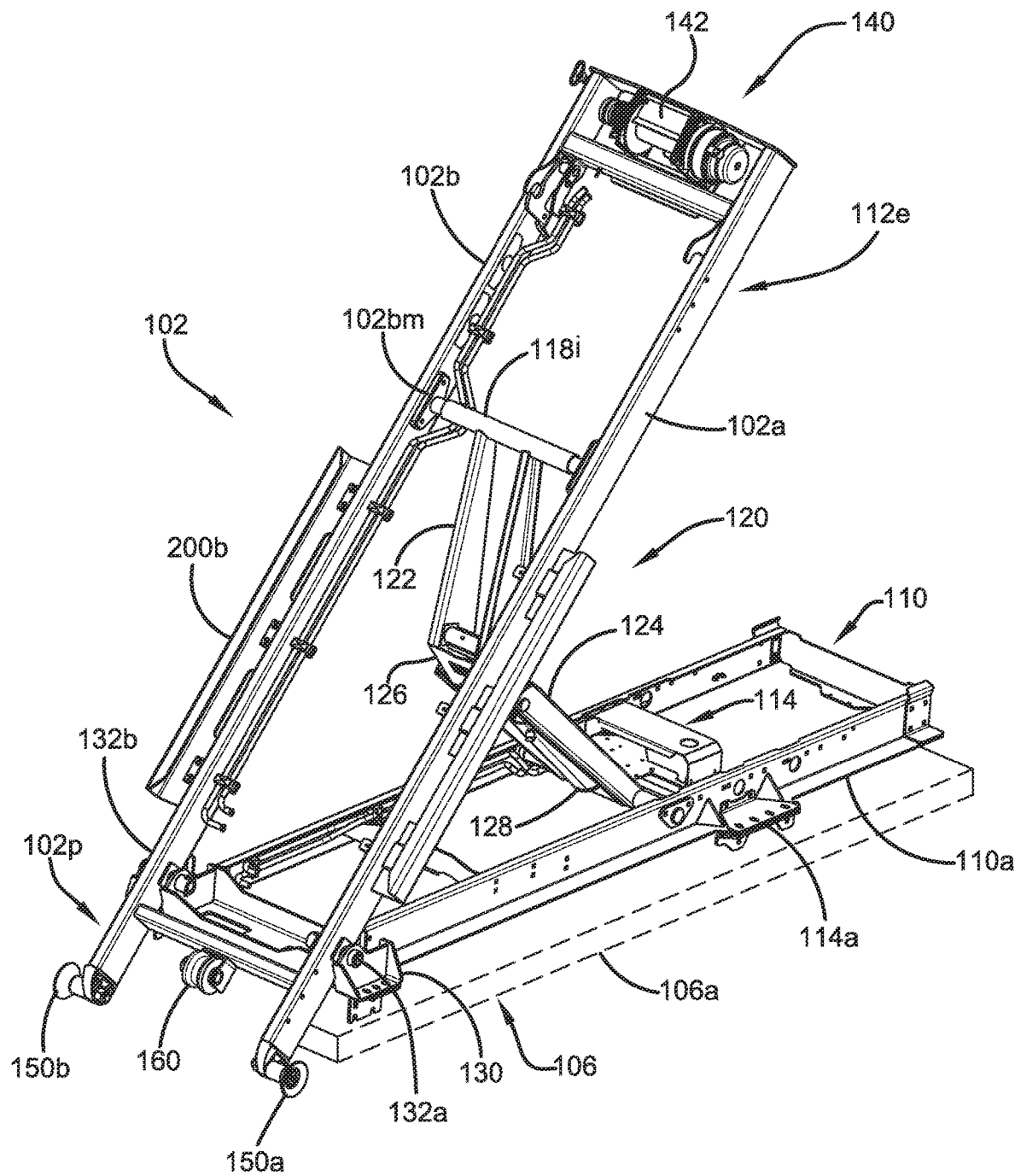
FIG. 2 is a perspective view showing the right side of an exemplary embodiment of a hoist system for raising and mounting an interchangeable vehicle body onto a vehicle chassis according to the present invention.

Referring now to the drawings wherein the showings are for purposes of illustrating embodiments of the article only and not for purposes of limiting the same, and wherein like reference numerals are understood to refer to like components:

FIGS. 1 and 2 are perspective views respectively showing the left and right sides of exemplary embodiments of a hoist system 100 according to the present invention. The hoist system 100 includes a hoist frame 102 for raising and mounting an interchangeable vehicle body 104 onto a vehicle chassis 106. The hoist frame 102 is defined by first and second parallel frame members 102a, 102b. The hoist frame 102 is provided for slidably supporting the interchangeable body 104. The hoist frame 102 includes a pivot end 102p, about which the hoist frame 102 pivots, and an elevated end 102e, which is elevated when raising and mounting the interchangeable vehicle body 104, as will be described in greater detail hereinbelow. The frame members 102a, 102b extend along the longitudinal axis of the hoist frame 102 that extends between the elevated end 102e and the pivot end 102p.

It is to be appreciated that the present specification includes descriptions of similar components such as the frame members 102a, 102b in which identical corresponding structures are described and given similar reference numerals. Insofar as both of such corresponding structures may not be clearly shown in a particular view, especially a detail view, it is to be understood and appreciated such corresponding structures resemble the structures that are clearly shown in the views.

Figure 4:
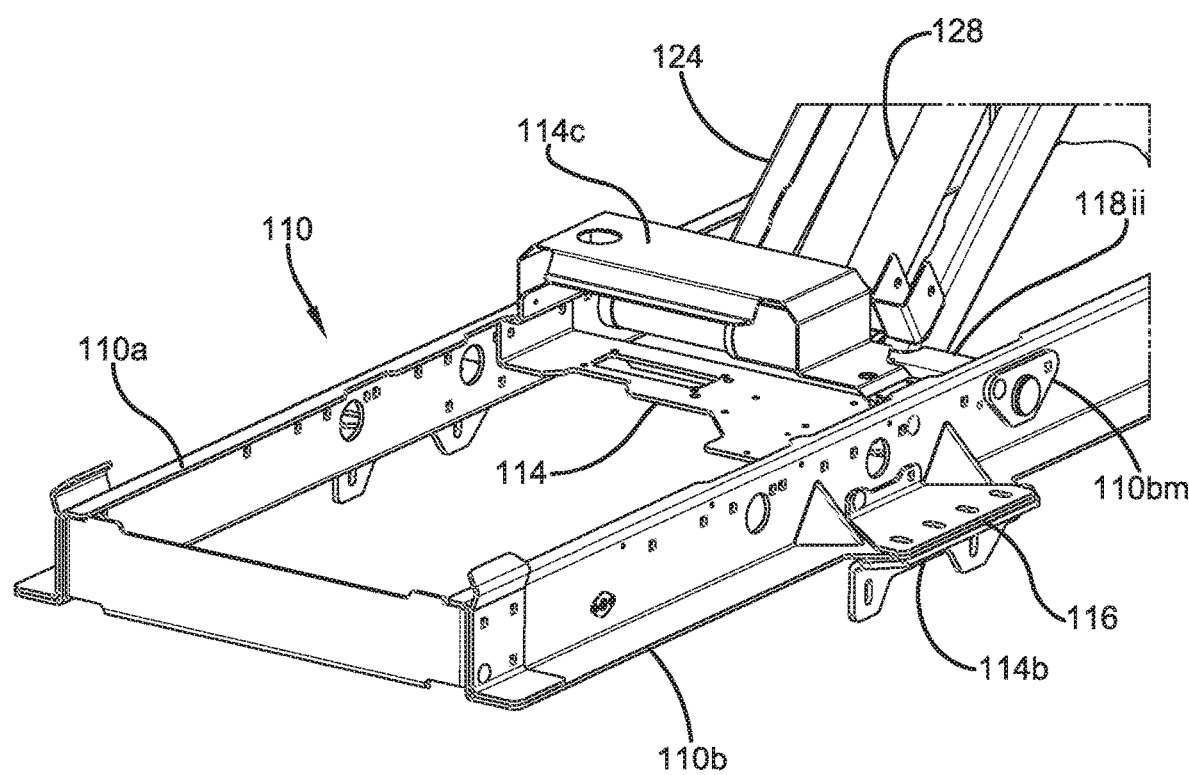
FIG. 4 is a detail view of the subframe with the pump plate and the hinged component cover according to an exemplary embodiment of the present invention.

A subframe 110 is provided for ultimately connecting the hoist frame 102 to the vehicle chassis 106. The subframe 110 is defined by a bolt-on assembly for fixedly connecting the hoist frame 102 to the vehicle chassis 106. Specifically, the subframe 110 is connected to the vehicle chassis 106 at a pump plate 114 and a mounting bracket 130. As particularly shown in the detail view of in FIG. 4, the pump plate 114 is formed integrally with the subframe 110 and includes mounting portions 114a, 114b that engage the vehicle chassis 106. The mounting portions 114a, 114b each include a series of mounting holes 116 that receive bolts to enable the pump plate 114 to be bolted to the vehicle chassis 106. Similar structures are included on the mounting bracket 130 as will be explained hereinbelow. A cover 114c is provided to protect the pump plate 114 from damage. The cover 114c can be made of metal or plastic or any other suitable material.

The subframe 110 is sized so that the pump plate 114 can be bolted on to first and second parallel vehicle chassis members 106a, 106b. It is to be appreciated that the pump plate 114 can be easily bolted into different locations of the subframe 110 to accommodate different classes of vehicles and different hoist capacities and dump angles (as will be explained in greater detail hereinbelow). The subframe 110 thus eliminates the need for welding to the vehicle chassis 106 and the resulting damage thereto. The mounting portions 114a, 114b are reinforced members for providing support to the hoist system 100. This enables the subframe 110 to be made of prefabricated sheet metal portions, which is a lighter, less expensive material than the structural steel used with previous type welded hoist systems, resulting in improved economy and efficiency with the present invention.

With further reference to FIGS. 1 and 2, a linkage is provided for connecting the hoist frame 102 to the subframe 110. The linkage is preferably a type of hinge joint member 120 for raising the elevated end 102e of the hoist frame 102. The hinge joint member 120 includes an upper leaf member 122 and a lower leaf member 124 which are pivotally connected to each other by a pin member 126.

Figure 3:
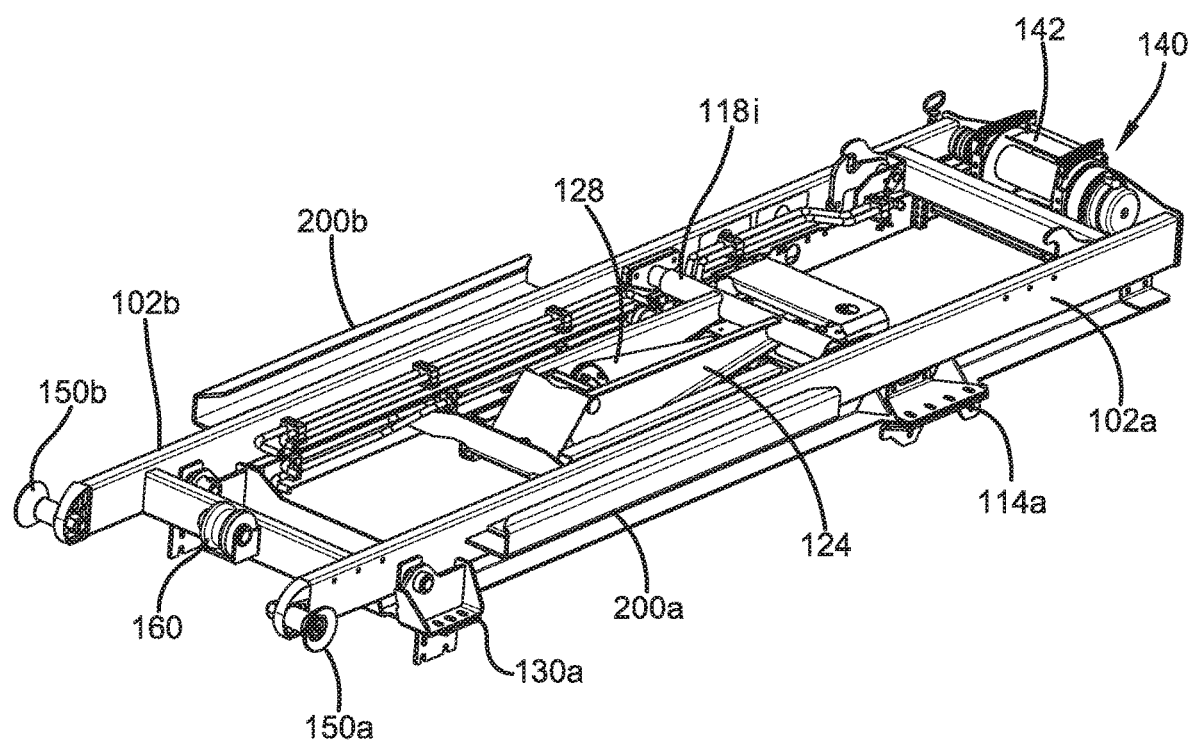
FIG. 3 is a perspective view of a collapsed state of an exemplary embodiment of a hoist system for raising and mounting an interchangeable vehicle body onto a vehicle chassis according to the present invention.

The upper and lower leaf members 122, 124 each include a pair of parallel structures designed to nest inside each other when the hoist system 100 is in a collapsed position as shown in FIG. 3, when the interchangeable body 104 (not shown in this view) is fully mounted and secured to the vehicle chassis 106. The upper leaf member 122 is moveably connected to the hoist frame 102 by a first pivot bar 118i that spans the parallel frame members 102a, 102b and secured to rotate therebetween during raising and lowering of the hoist system 100. The lower leaf member 124 is moveably connected to the subframe 110 by a second pivot bar 118ii to rotate therebetween during raising and lowering of the hoist system 100.

The hinge joint member 120 is raised and lowered to raise and lower the elevated end 102e of the hoist frame 102 using a hydraulic pump cylinder 128. The hydraulic pump cylinder 128 is also attached to the second pivot bar 118ii that engages the subframe 110 along with the lower leaf member 124. These aspects are especially shown in the collapsed view of FIG. 3 along with the view of FIG. 4. The hydraulic pump cylinder 128 nests inside the lower leaf member 124 when in the collapsed position. Specifically, the hydraulic pump cylinder 128 is attached to the subframe 110, so that forces from the hydraulic pump cylinder 128 are transferred to the mounting points 114a and 114b.

A special feature of the present hoist system 100 is that it is modular in construction, enabling a variety of different configurations to suit a variety of different applications. As shown particularly in FIG. 4, the subframe 110 includes first and second parallel subframe members 110a, 110b which are each formed with a plurality of modular self-locating holes. The figure depicts three modular self-locating holes, though any suitable number can be employed without departing from the invention. The second pivot bar 118ii can be removably inserted and retained in a respective pair of opposing holes and secured with respective chevron-shaped modular connection brackets 110am, 110bm. The subframe members 110a, 110b are formed with suitable bolt holes for enabling the connection brackets 110am, 110bm to be securely bolted thereto. The plurality of modular self-locating holes enables the second pivot bar 118ii to be engaged and supported at a respective plurality of selective positions along the subframe 110. In this manner, the hoist system 100 can be modularly adjusted in different locations to provide different capacities.

As depicted in FIGS. 1 and 2, a similar plurality of modular self-locating holes can also be formed on the first and second parallel frame members 102a, 102b. The first pivot bar 118i can be removably inserted and retained in a respective pair of opposing holes and secured with respective chevron-shaped modular connection brackets 102am, 102bm. The first and second parallel frame members 102a, 102b are also formed with suitable bolt holes for enabling the connection brackets 102am, 102bm to be securely bolted thereto. The plurality of modular self-locating holes enables the first pivot bar 118i to be engaged and supported at a respective plurality of selective positions along the hoist frame 102. In this manner also, the hoist system 100 can be modularly adjusted in different locations to provide different capacities.

By selectively positioning the first and second pivot bars 118i, 118ii, the hoist system 100 can be selectively adjusted to be close to or farther from the vehicle cab along the hoist frame 102, in order to accommodate different types of interchangeable bodies having different weights and other various capacities. For example, when used with a dump body, the linkage is used for dumping, and the selective positioning of the pivot bars 118i, 118ii is useful for selecting a suitable dump angle for a given load. It is understood that a higher dump angle is more useful for dumping a viscous load such as mud, though there is a penalty of hauling capacity due to reduced leverage within the linkage. Conversely, a load of rocks slides out more easily and can be set at a lower dump angle with the resulting increased load capacity. In this manner, the present invention offers a significant improvement over previous type welded hoist systems which cannot be selectively positioned since the dump angles are fixed at the point of welding.

With continued reference to FIGS. 1 and 2, a mounting bracket 130 is provided for pivotally connecting to the pivot end 102p of the hoist frame 102. Like the pump plate 114, the mounting bracket 130 is a bolt-on assembly for fixedly connecting the hoist system 100 to the vehicle chassis 106. The mounting bracket 130 includes first and second pivot pins 132a, 132b, about which the hoist frame 102 pivots during raising and lowering of the hoist. The pivot pins 132a, 132b are mounted on each respective side of the hoist frame 102, through bores formed in respective parallel frame members 102a, 102b.

Figure 6:
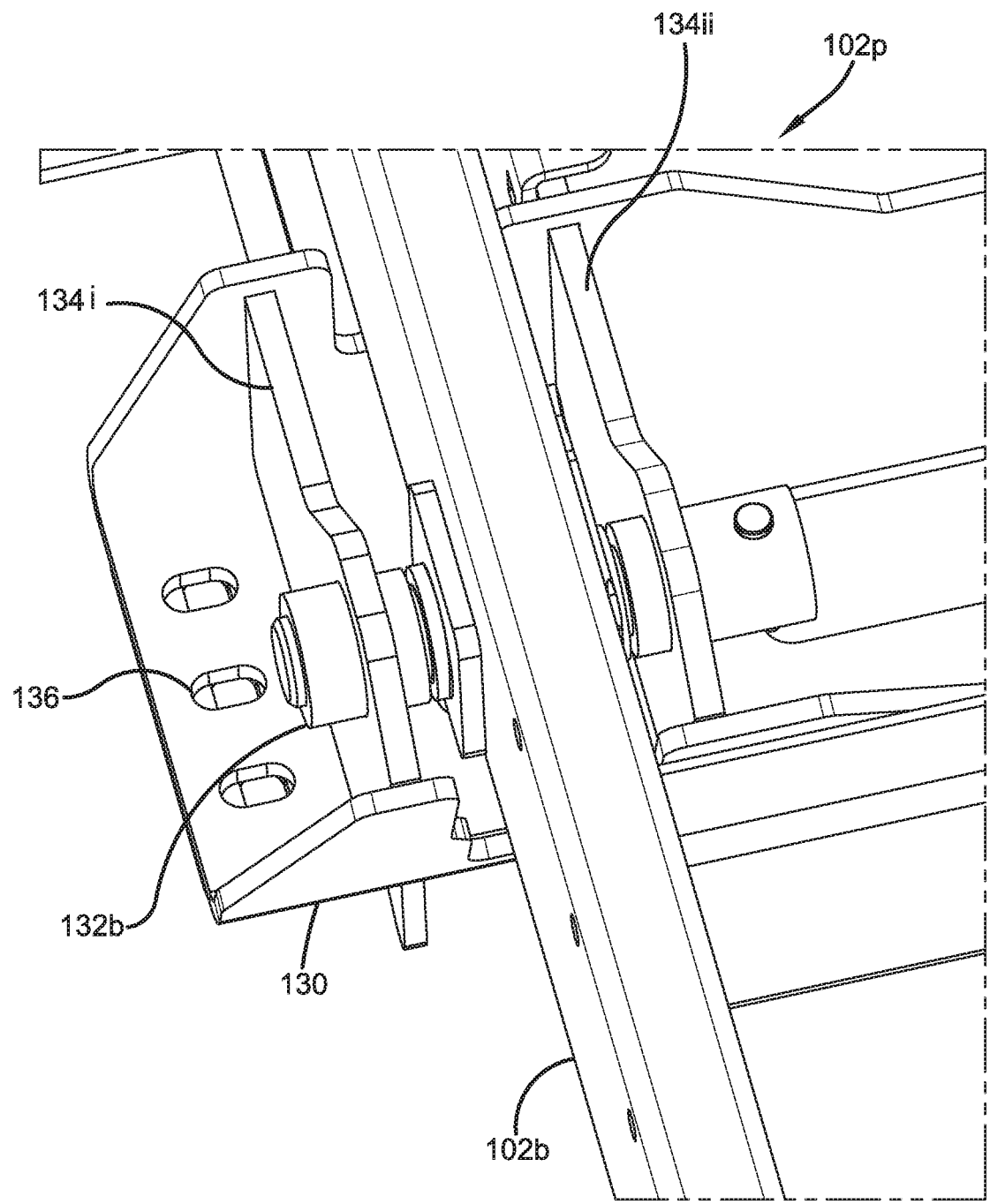
FIG. 6 is a detail view of the pivot end of the hoist body according to an exemplary embodiment of the present invention.

As particularly shown in the detail view of FIG. 6, which shows one side of the pivot end 102p, the second pivot pin 132b is received through bores in transverse portions 134i, 134ii of the mounting plate 130, which are on opposite sides of the bore in the second parallel frame member 102b. The second pivot pin 132b can be of a common type structure and include a cotter pin for retaining the pin 132b against accidental slippage, as is understood in the art. It is to be appreciated that there is a similar structure associated with the first pivot pin 132a through the first parallel frame member 102a and the mounting plate 130. As also shown in FIG. 6, the mounting plate 130 includes a series of mounting holes 136 that receive bolts to enable the mounting plate 130 to be bolted to the vehicle chassis 106 using common type bolts as are known in the art.

Figure 5:
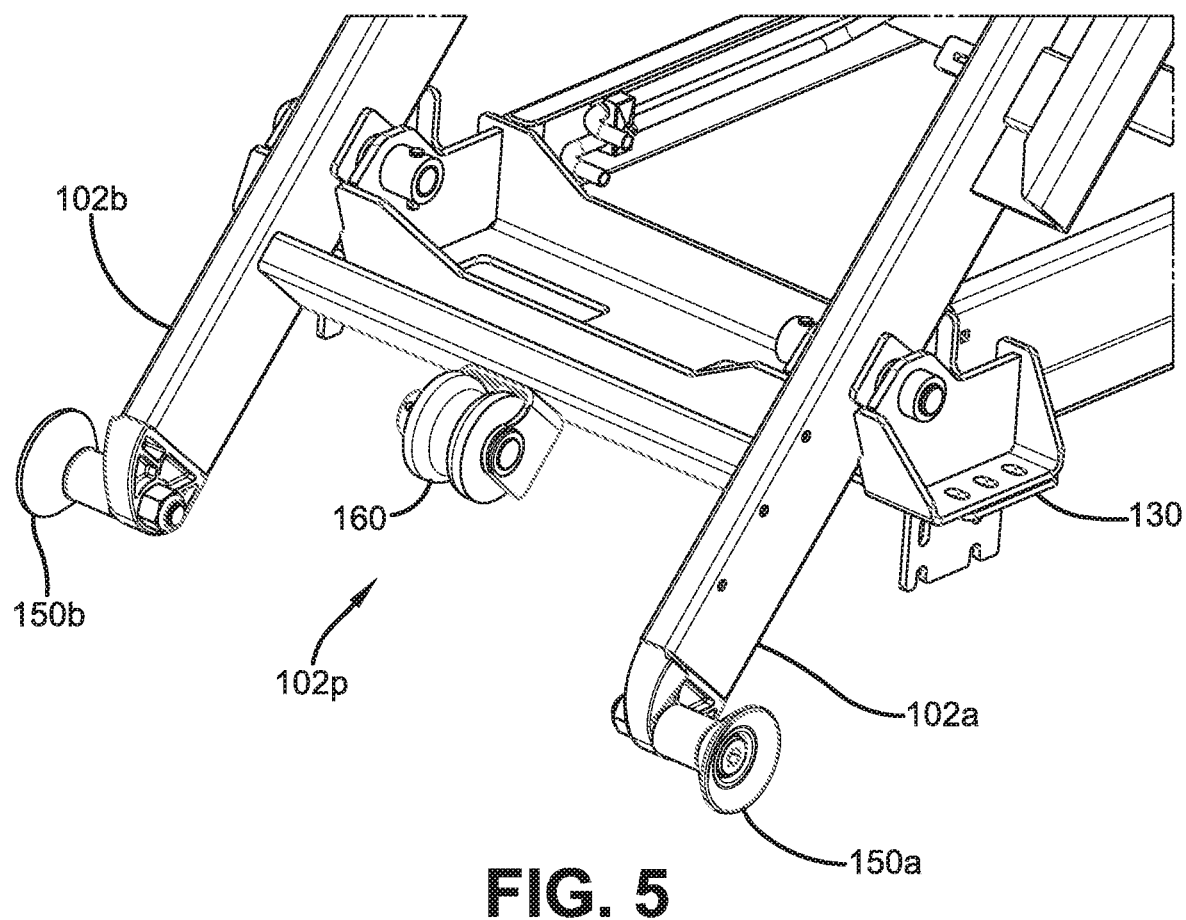
FIG. 5 is a detail view of the rollers at the pivot end of the hoist body according to an exemplary embodiment of the present invention.

As particularly shown in FIG. 1, a winch assembly 140 is retained in the elevated end 102e of the hoist frame 102. The winch assembly 140 includes a winch motor 142 that feeds out a cable 144 that extends along the longitudinal axis of the hoist frame 102 to the pivot end 102p and connects to a hook 146, for raising the interchangeable body 104 onto the hoist frame 102. In the preferred embodiment, the hook 146 is a swivel hook that swivels on the end to release any torsion on the cable 114 that might result from twisting, which would reduce the working life of the cable 144. In the preferred embodiment, the winch motor 142 is a hydraulic motor, as will be explained in greater detail hereinbleow As particularly shown in the detail view of FIG. 5, first and second rollers 150a, 150b are provided at the pivot end 102*p* of the hoist body 102. The first and second rollers 150*a*, 150*b* are connected to the respective ends of the first and second parallel frame members 102*a*, 102*b* so as to face in an outward direction, away from the longitudinal axis of the hoist frame 102. In this manner, the rollers 150*a*, 150*b* engage the interchangeable body during raising and mounting to the hoist 100, to provide low friction support during movement. As a special feature, the first and second rollers 150*a*, 150*b* are greaseless rollers, for providing an even lower frictional engagement for further facilitating mounting of the interchangeable vehicle body onto the hoist 100. In the preferred embodiment, the greaseless rollers 150*a*, 150*b* are steel casted parts with phenolic bearings inside to replace the manually fabricated metal rollers which performed with a metal on metal surface which required grease in previous type devices, thereby further reducing wear and tear.

Figure 7:
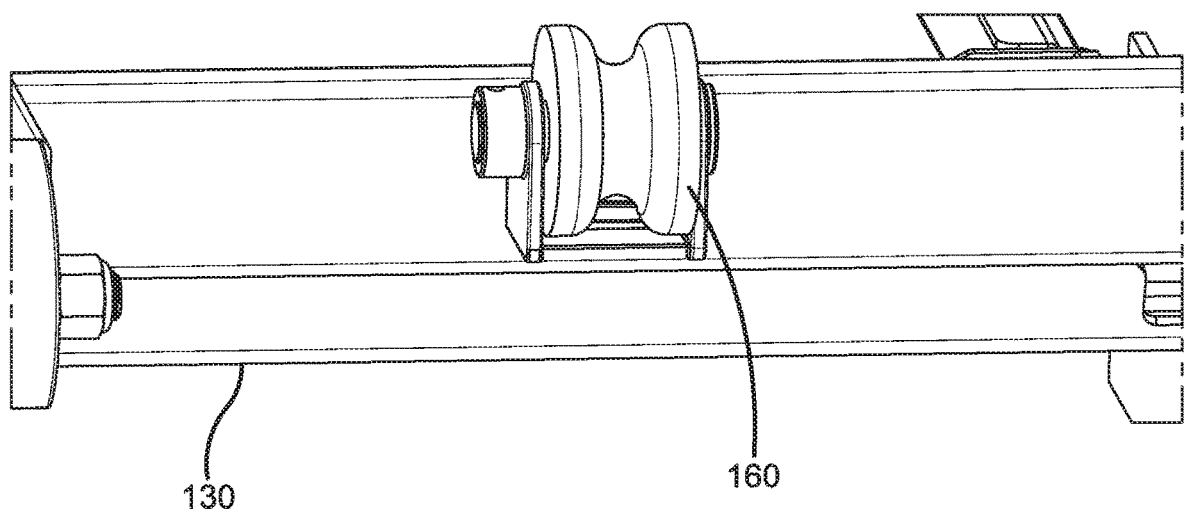
FIG. 7 is a detail view of the V-roller according to an exemplary embodiment of the present invention.

As particularly shown in the detail view of FIG. 7, a V-roller 160 is provided. In the preferred embodiment, the V-roller 160 is a greaseless V-roller assembly for slidably supporting the cable 144 of the winch assembly 140. In this manner, the V-roller 160 provides support and guidance for the cable 144 when raising the interchangeable body 104 onto the hoist frame 102, In the preferred embodiment, the V-roller 160 is formed of a polymer material such as Nylatron to replace the metal rollers used in previous type devices, thereby further reducing wear and tear on the cable 114 and not requiring grease.

Figure 8:
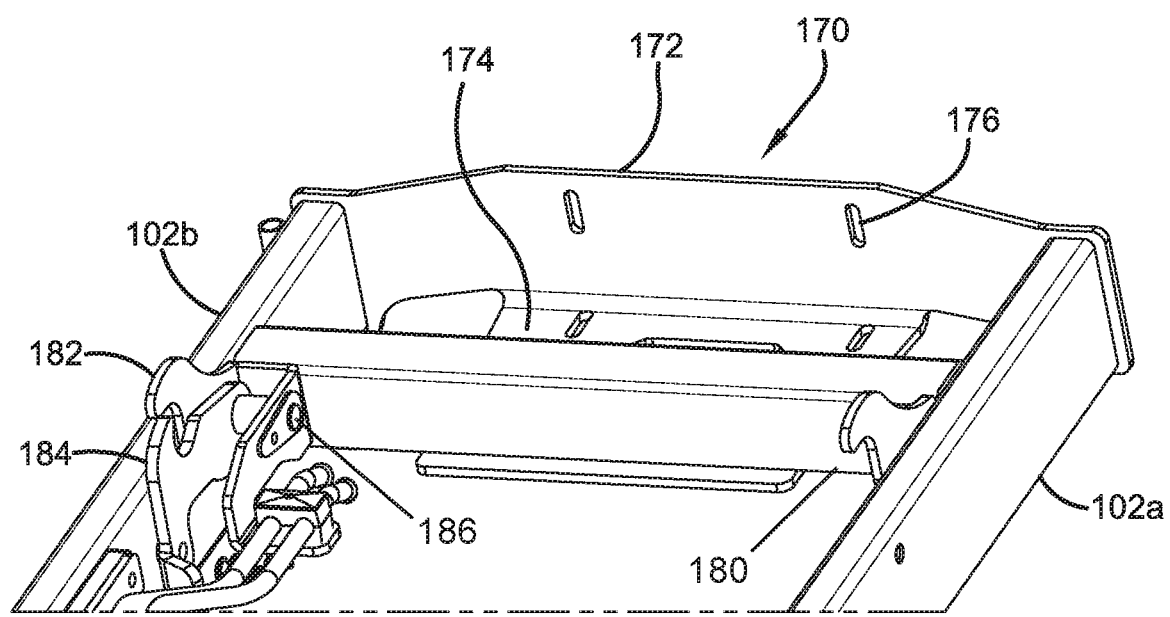
FIG. 8 is a detail view of the winch plate according to an exemplary embodiment of the present invention.

As particularly shown in the detail view of FIG. 8, a winch plate 170 is attached to the elevated end 102*e* of the hoist frame 102 and is used to support the winch assembly 140. The winch plate 170 is a formed piece of sheet metal that replaces the single tube at the front of the previous type devices. The main advantage to the winch plate 170 compared to the previous type devices is that it allows the winch assembly 140 to be mounted in two planes verses a single plane as with the single tube design of the previous type devices. The winch plate 170 includes two perpendicular sides, a first side 172 and a second side 174, and each side 172, 174 has a set of oblong holes 176 for connecting to two respective perpendicular sides of the winch assembly 140. In this manner, the winch plate 170 supports the winch assembly 140 in two separate planes, providing greater securement of the winch assembly 140. Also, the winch plate 170 provides additional room for accommodating the swivel hook 146.

In front of the winch plate 170 are a front body hold downs 180 and a body lock 182. As an interchangeable body 104 is being drawn up with the cable 144, it encounters a switch within the body lock 182 which stops the winch motor 142, halting the forward advance of the body 104. The body lock 182 includes an engaging hook 184 to retain the body 104 in a secure position. The front body hold down 180 is similar to the body lock 182 but does not have a hook and functions as a stop for halting forward motion. The body lock 182 is assembled with a quick release pin, which enables replacement of the body lock 182 in the event of damage, as compared with the previous type devices in which a corresponding component is welded. This allows for quick replacement in the field verses the welded-on method from the previous type devices which would require grinding, welding, and additional paint work when the lock part needs replacement.

Figure 9:
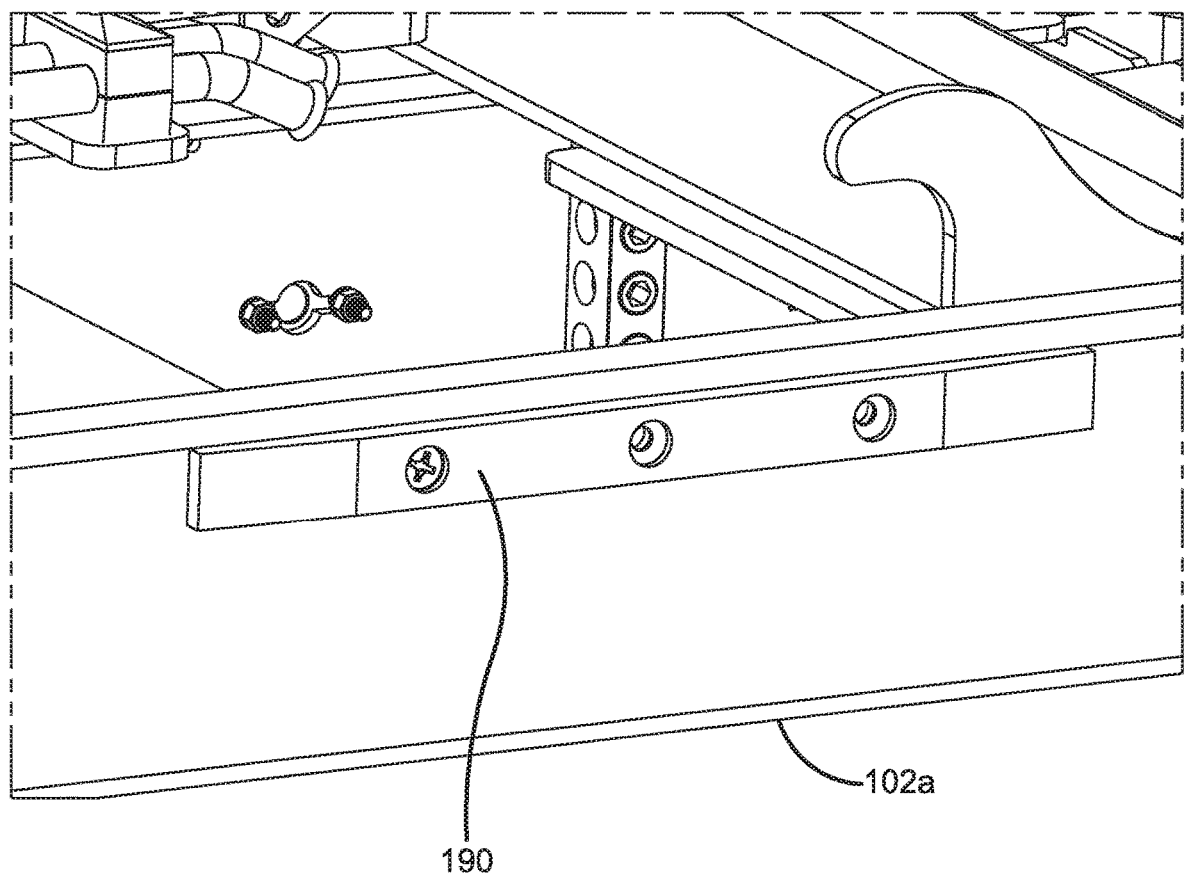
FIG. 9 is a detail view of a slide body guide slide pad according to an exemplary embodiment of the present invention.

The detail view of FIG. 9 shows particular details of a slide strip 190. There can be a slide strip 190 mounted to each of the parallel frame members 102*a*, 102*b*, preferably on an exterior side, facing outwardly away from the longitudinal axis of the hoist frame 102, to protect the parallel frame members 102*a*, 102*b* from destructive contact with the interchangeable body 104. The slide strip 190 is preferably a flat strip affixed to the frame members 102*a*, 102*b*. There can be a plurality of slide strips 190 mounted with screws having recessed heads onto the exterior sides each of the parallel frame members 102*a*, 102*b* in order to provide additional low friction surfaces.

In the preferred embodiment, the slide strips 190 are greaseless slide strips formed of a low friction material to support the interchangeable vehicle body during movement along the hoist. In the preferred embodiment, the slide strips 190 are formed of Nylatron, reducing wear and tear on the system. In particular, the slide strips 190 (and other Nylatron and other polymer parts described herein) reduce metal-on-metal contact between the hoist system 100 and the interchangeable bodies 104, which can expose bare metal to the elements, causing rust, which can shorten the useful life of the hoist system 100. Also, the Nylatron slide strips 190 can be replaced when worn out, further extending the useful life of the hoist system 100.

Figure 10:
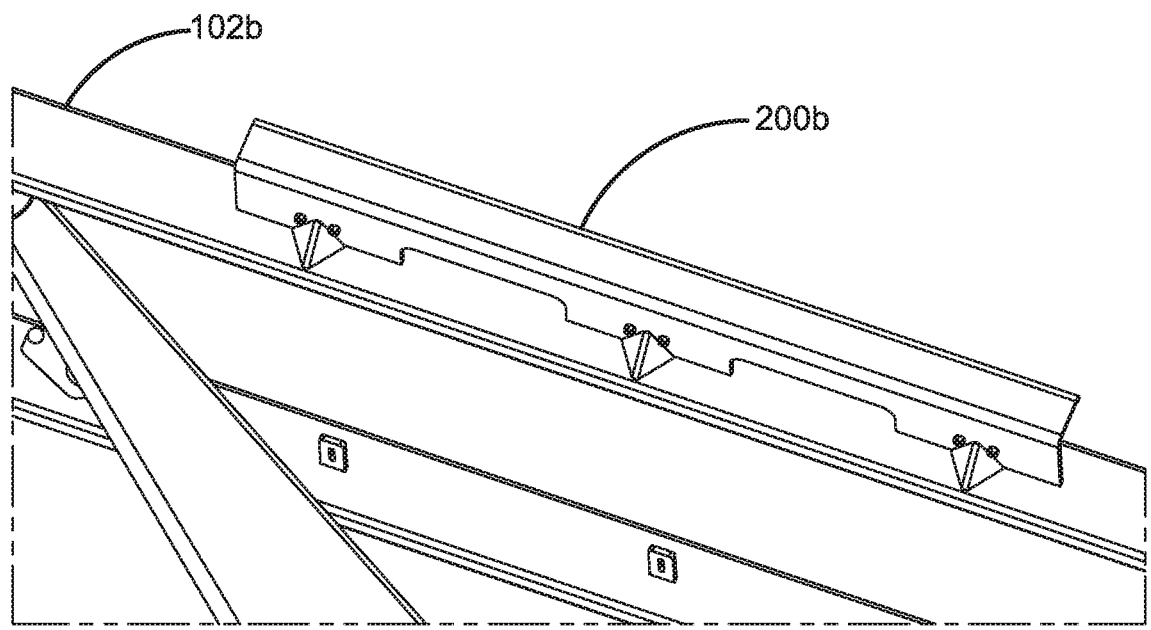
FIG. 10 is a detail view of an underside of a body hold down according to an exemplary embodiment of the present invention.
Figure 11:
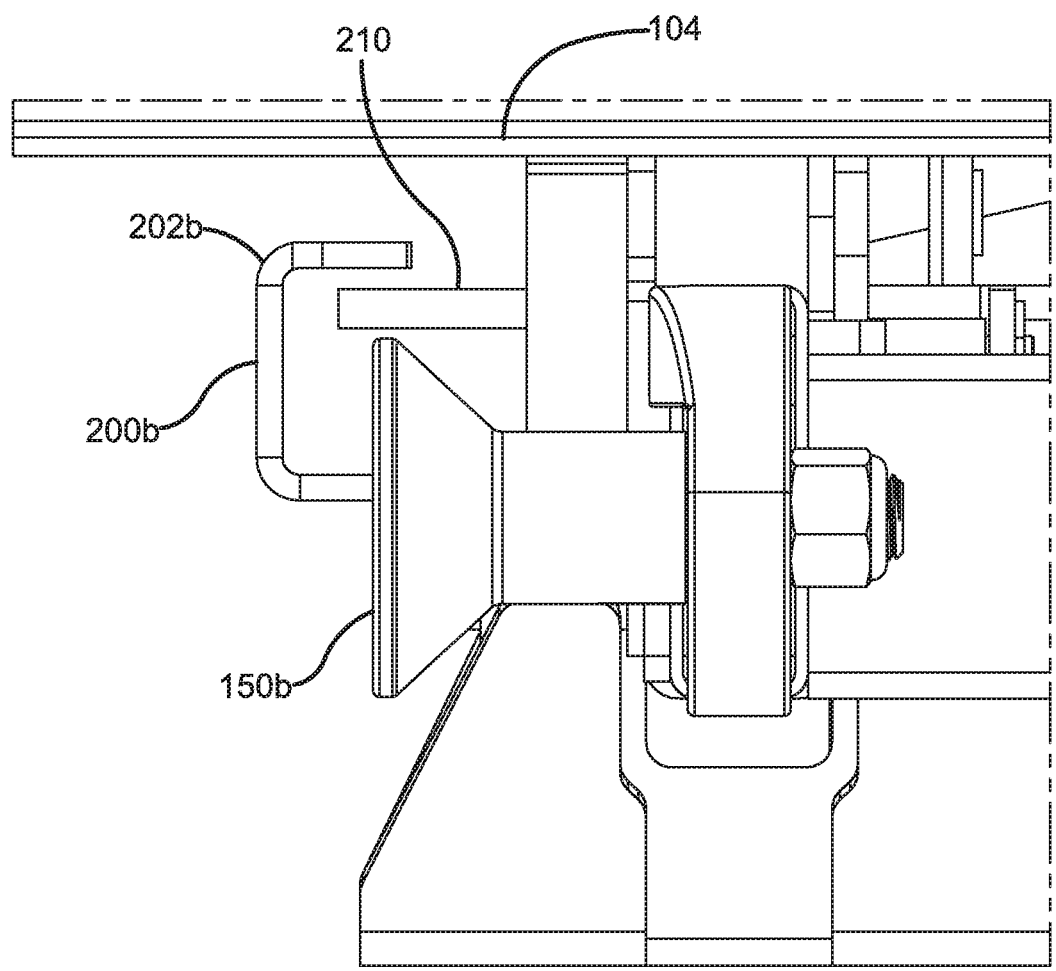
FIG. 11 is a rear view of the side channel features according to an exemplary embodiment of the present invention.
Figure 13:
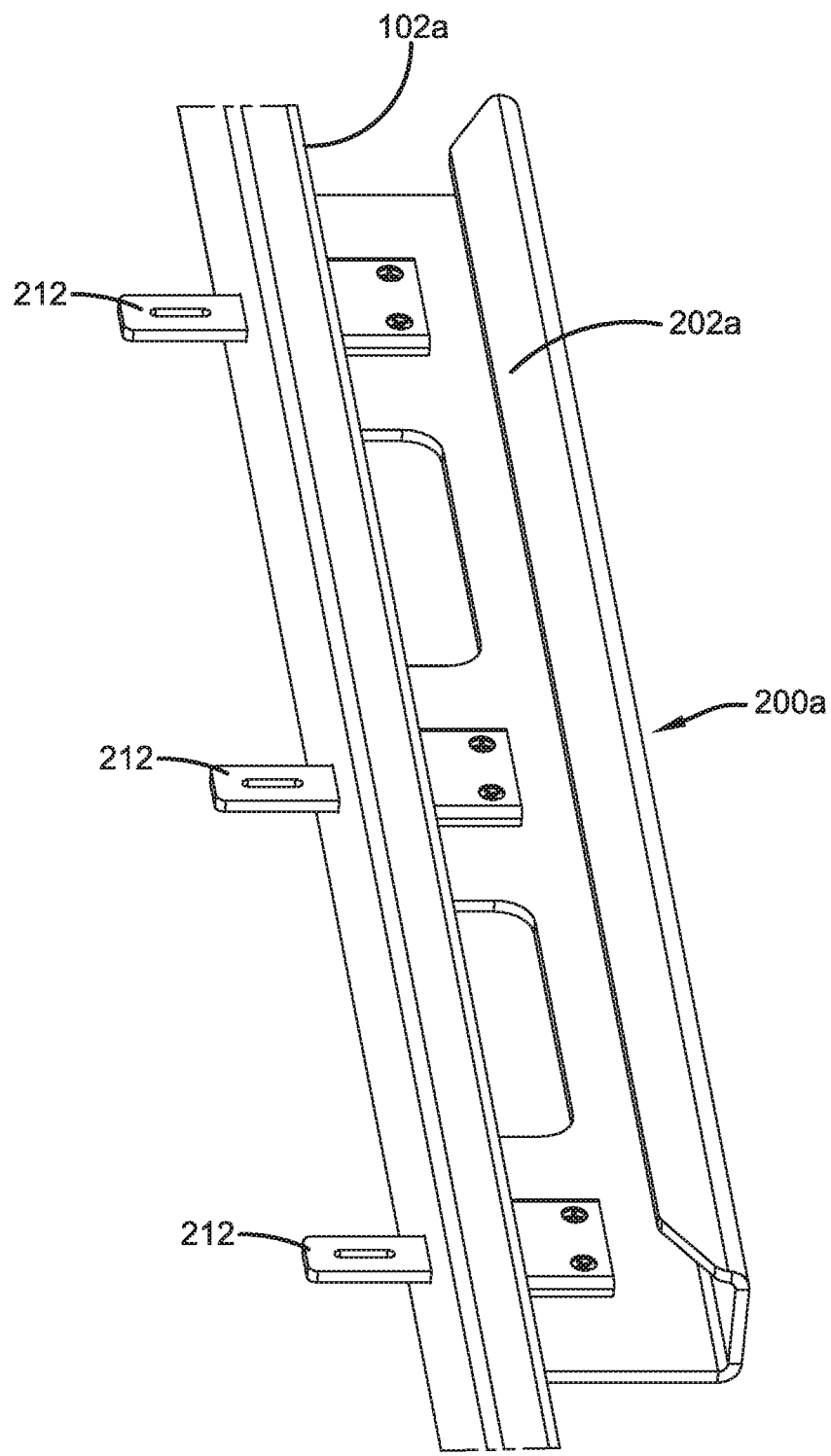
FIG. 13 is a detail view of a side rail according to an exemplary embodiment of the present invention.

FIGS. 2, 3, and the details and rear views of FIGS. 10, 11, and 13 show particular details of body hold downs in the form of side channels 200*a*, 200*b*. As shown, the side channel body hold downs 200*a*, 200*b* are hooked structures having a generally C-shaped cross section having upper portions 202*a*, 202*b* configured to receive and retainably engage mating components 210 formed on an interchangeable body 104. Each of the body hold downs 200*a*, 200*b* are mounted to each of the respective parallel frame members 102*a*, 102*b*, preferably on the respective exterior sides, facing outwardly away from the longitudinal axis of the hoist frame 102. The C-shaped cross section with resulting upper portions 202*a*, 202*b* are sufficiently large to engage a variety of different sized mating components 210 associated with a variety of different sized interchangeable vehicle bodies 104, and thereby enable a variety of different sized interchangeable vehicle bodies to be used on the hoist.

As especially shown in FIG. 13, the side channels 200*a*, 200*b* cooperate with slide pads 212 in the form of metal brackets each having an upward-facing surface including a Nylatron pad that are attached to the first and second parallel frame members 102*a*, 102*b*. Upon hoisting, the interchangeable body 104 rides within the body hold downs 200*a*, 200*b*, which keep the body 104 aligned and supported. The body 104 does not contact the body hold downs 200*a*, 200*b* but allows a clearance of approximately ⅛-inch, as shown in FIG. 11. When a body 104 is fully loaded, it rests upon the body hold downs 200*a*, 200*b*, which support the body 104 in the event of a rollover, thereby providing additional safety.

Figure 12:
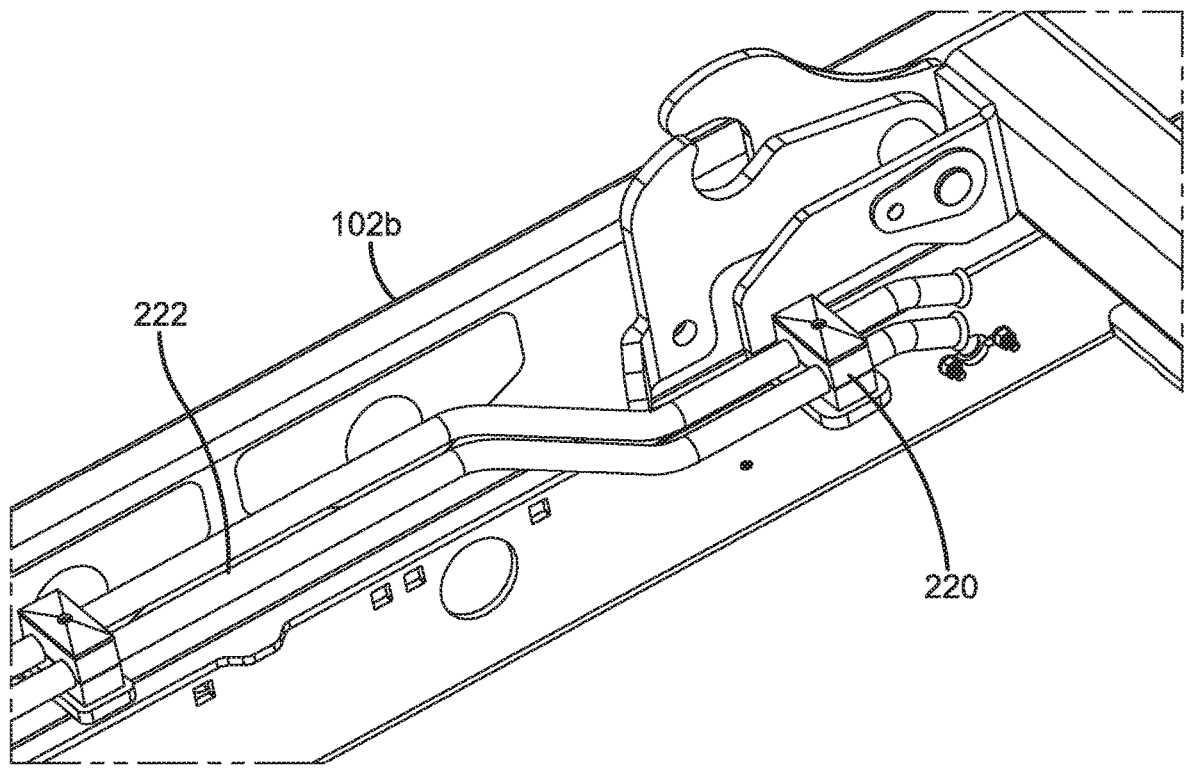
FIG. 12 is a detail view of a piping support according to an exemplary embodiment of the present invention.

As shown in the detail views of FIG. 12, the frame members 102*a*, 102*b* can include a support section 220 that provides a piping support for piping 222, as can also be seen in FIG. 3. The piping 222 provides hydraulic oil to the hydraulic winch motor 142. It is appreciated in the art that using a hydraulic winch motor is a lower volume option that is needed for certain applications because it has a much greater duty cycle. However, it is to be appreciated that other types of winch motors 142 such as electric motors can alternatively be employed without departing from the invention.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A hoist system for raising and mounting an interchangeable vehicle body onto a vehicle chassis, comprising:
    a hoist frame for slidably supporting the interchangeable body, wherein the hoist frame includes a pivot end and an elevated end;
    a subframe with a bolt-on assembly for fixedly connecting to the vehicle chassis;
    a linkage for connecting the hoist frame to the subframe, wherein the linkage comprises a hinge joint member for raising the elevated end of the hoist frame;
    a mounting bracket for pivotally connecting to the pivot end of the hoist frame, wherein the mounting bracket has a bolt-on assembly for fixedly connecting to the vehicle chassis;
    a winch assembly, retained in the elevated end of the hoist frame and extending to the pivot end, for raising the interchangeable body onto the hoist frame; and
    a plurality of modular self-locating holes, formed on at least one of the subframe or the hoist frame, for engaging and supporting the linkage at a respective plurality of selective positions, enabling different configurations of the hoist system to suit different applications.

2. The hoist system of claim 1, wherein the hoist frame comprises first and second parallel frame members, extending along a longitudinal axis of the hoist frame between the elevated end and the pivot end, for supporting the interchangeable vehicle body.

3. The hoist system of claim 2, wherein at least one of the first and second parallel frame members further comprises a body hold down bracket to enable different sized interchangeable vehicle bodies to be used on the hoist frame.

4. The hoist system of claim 2, wherein at least one of the first and second parallel frame members further comprises a body hold down bracket that supports at least one greaseless slide pad formed of a low friction material to support the interchangeable vehicle body during movement along the hoist frame.

5. The hoist system of claim 2, wherein at least one of the first and second parallel frame members further comprises at least one greaseless slide strip, formed of a low friction material, and mounted along a side of the respective one of the first and second parallel frame members, for protecting against frictional damage.

6. The hoist system of claim 2, wherein at least one of the first and second parallel frame members further comprises at least one greaseless roller, mounted at a pivot end of the respective one of the first and second parallel frame members, for facilitating mounting of the interchangeable vehicle body onto the hoist frame.

7. The hoist system of claim 1, further comprising a hydraulic cylinder, connected to the subframe, for displacing the linkage to raise the elevated end of the hoist frame.

8. The hoist system of claim 1, further comprising a pump plate, connected to the subframe, for supporting hydraulic and electrical components that power the system.

9. The hoist system of claim 1, further comprising a greaseless V-roller assembly for slidably supporting a cable of the winch assembly for raising the interchangeable body onto the hoist frame.

10. The hoist system of claim 1, further comprising a winch plate in the elevated end of the hoist frame, wherein the winch plate comprises two perpendicular sides for connecting to two respective sides of the winch assembly, such that the winch plate supports the winch assembly in two separate planes.

11. The hoist system of claim 1, wherein the subframe comprises first and second parallel subframe members and wherein the plurality of modular self-locating holes are formed on each of the first and second parallel subframe members for engaging and supporting the linkage at a respective plurality of selective positions along the subframe, enabling the hoist system to be modularly adjusted to provide different capacities.

12. The hoist system of claim 11, wherein the plurality of modular self-locating holes comprises three modular self-locating holes.

13. The hoist system of claim 1, wherein the hoist frame comprises first and second parallel frame members and wherein the plurality of modular self-locating holes are formed on each of the first and second parallel frame members for engaging and supporting the linkage at a respective plurality of selective positions along the hoist frame, enabling the hoist system to be modularly adjusted to provide different capacities.

14. The hoist system of claim 13, wherein the plurality of modular self-locating holes comprises three modular self-locating holes.

* * * * *